(12) United States Patent
Kuntze et al.

(10) Patent No.: US 6,659,517 B1
(45) Date of Patent: Dec. 9, 2003

(54) APPARATUS FOR TRANSMITTING A MOVEMENT BETWEEN COMPONENTS

(75) Inventors: Torsten Kuntze, Berlin (DE); Bernd Malner, Berlin (DE); Jens Schimmelpfennig, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/868,186
(22) PCT Filed: Dec. 14, 1999
(86) PCT No.: PCT/DE99/04023
§ 371 (c)(1), (2), (4) Date: Jun. 15, 2001
(87) PCT Pub. No.: WO00/36620
PCT Pub. Date: Jun. 22, 2000

(30) Foreign Application Priority Data

Dec. 16, 1998 (DE) .......................... 198 59 815
Jan. 15, 1999 (DE) .......................... 199 02 833

(51) Int. Cl.[7] .............................................. E05C 19/18
(52) U.S. Cl. ...................................... 292/262; 292/139
(58) Field of Search ............................... 218/2, 4, 5, 14, 218/120, 140, 154, 153; 292/254, 262–278, 300, 235, 139

(56) References Cited

U.S. PATENT DOCUMENTS 2,667,554 A    1/1954   Shores
3,624,329 A   11/1971   Fisher et al.
3,780,354 A * 12/1973   Sharp .......................... 218/154
5,510,590 A    4/1996   Hux

FOREIGN PATENT DOCUMENTS

| DE | 3810453 A1 | 10/1988 |
| DE | 4015979 A1 | 11/1991 |
| DE | 4110243 A1 | 10/1992 |
| DE | 19524636 C1 | 9/1996 |
| DE | 19705098 A1 | 8/1998 |
| EP | 0 817 225 A1 | 1/1998 |

* cited by examiner

*Primary Examiner*—Lincoln Donovan
(74) *Attorney, Agent, or Firm*—Morrison & Foerster LLP

(57) ABSTRACT

In an apparatus for transmitting and method a movement which, as a function of a first, translational movement of a first coupling element to which a first component can be coupled, produces a translational movement of a second coupling element to which a second component can be coupled. The invention provides that the first and the second coupling element are connected to one another, such that they can move by a first rigid element, and in that the first coupling element is connected to a first lever which is mounted in a fixed position, and the second coupling element is connected to a second lever which is mounted in a fixed position. When a movement is being transmitted, the arrangement thus results in the capability first of all to retard the movement of the second component and later to accelerate it again in a corresponding manner, or vice versa.

9 Claims, 8 Drawing Sheets

APPARATUS FOR TRANSMITTING A MOVEMENT BETWEEN COMPONENTS

Figure 1:
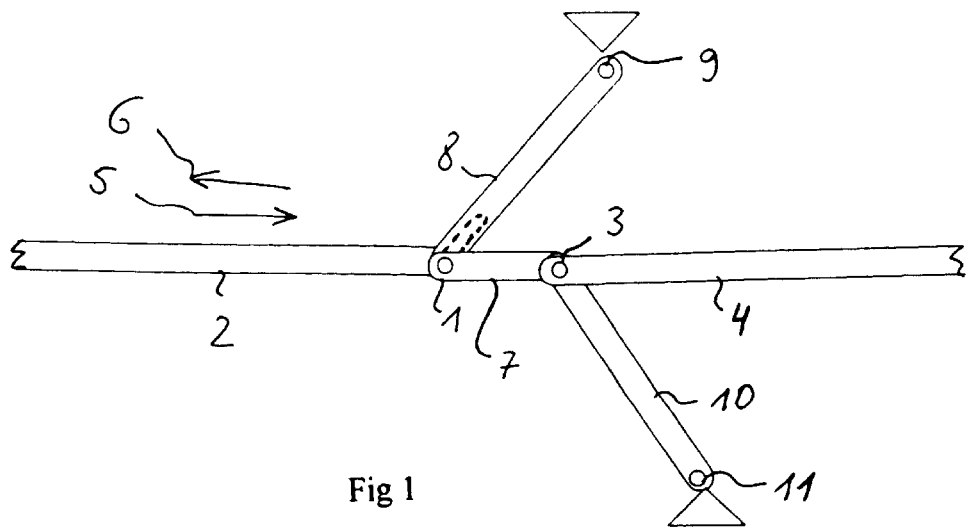

The invention relates to an apparatus for transmitting a movement between two components, which, as a function of a first, translational movement of a first coupling element to which a first component is coupled, produces a translational movement of a second coupling element to which a second component is coupled.

Such an apparatus is known from DE 195 24 636 C1, for example as an angled drive for a high-voltage power breaker. This document describes the capability to drive three switch poles of a three-pole high-voltage power breaker by means of a common drive via a drive linkage, with each switch pole being connected to the drive by means of a crank which, firstly, changes the direction of the drive movement, and secondly produces a step-up ratio.

In this document, the different initial positions of the individual cranks result in a time offset in the operation of the individual switch poles.

Each individual angled crank comprises a two-armed lever whose lever arms are at right angles to one another, with the ends of the lever arms forming coupling elements to which, firstly, a vertical switching rod and, secondly, the horizontal drive rod can be coupled as components. Any translational movement of the free end of the first lever arm, which is connected to the drive rod, results in a translational movement of the free end of the second lever arm, which is connected to the switching rod.

The described design results in the switch poles switching in a staggered manner one after the other in time.

The present invention is based on the object of providing an apparatus of the type mentioned initially, which allows a variable step-up ratio using simple means.

According to the invention, the object is achieved in that the first and the second coupling element are connected to one another, such that they can move, by means of a first rigid element, and in that the first coupling element is connected in a hinged manner to a first lever which is mounted at a first, fixed-position bearing point such that it can pivot, and in that the second coupling element is connected in a hinged manner to a second lever which is mounted at a second fixed-position bearing point such that it can pivot, and in that the first and the second bearing point are spaced apart from one another, and are located on opposite sides of the movement path of the first rigid element.

When a movement is being transmitted, the apparatus according to the invention results in the first and the second component, which are coupled to one another by the apparatus, each being moved at essentially the same speed in a first phase of the movement, in the movement travel of the second component lagging behind that of the first component in a second phase, and in the second component being accelerated in a third phase. When a movement is being transmitted in the opposite movement sense, the second component is first of all accelerated with respect to the first component and, after this, the second component is retarded in a corresponding manner.

Advantageous refinements of the inventions can be found in the dependent claims 2 to 7.

The fixed-position bearing points are advantageously each located in the plane of the movement paths of the rigid elements and of the coupling elements.

The coupling elements are each arranged in the end regions of the rigid elements and may be in the form of connecting bolts or of some other mechanical component, to which the various other parts such as the lever and rigid elements can be coupled. The coupling elements may also be in the form of a linkage.

The invention also relates to a high-voltage power breaker having a number of switch poles, at least two of which can be driven by a common drive, with at least one of the common driveable switch poles being connected to the drive by means of an apparatus as claimed in one of claims 1 to 5.

A high-voltage power breaker has an interrupter unit in each switch pole, in which interrupter unit two switching contacts are brought into conductive contact with one another, or are disconnected from one another. For this purpose, at least one switching contact can be driven by means of the drive.

Such a high-voltage power breaker can easily be adjusted, for use in a polyphase high-voltage system having an apparatus according to the invention, in such a manner that the individual switch poles have a specific time offset, during switching on, with regard to the making of the first conductive contact between the switching contacts, for example with a lead or lag of 3 milliseconds between one another in each case. In this way, the various switch poles can be operated at a respectively advantageous time, with regard to the respective phase of the polyphase alternating current to be switched on.

It is also possible to use a common drive to operate two of the switch poles simultaneously for capacitive switching, while the third switch pole is operated with a time offset of 5 milliseconds after them. The third switch pole is then connected to the common drive by means of an apparatus according to the invention. For such offset switching operations, the individual switch poles are relieved as well as possible of the load involved in controlled operation in synchronism with a mains system.

Figure 2:
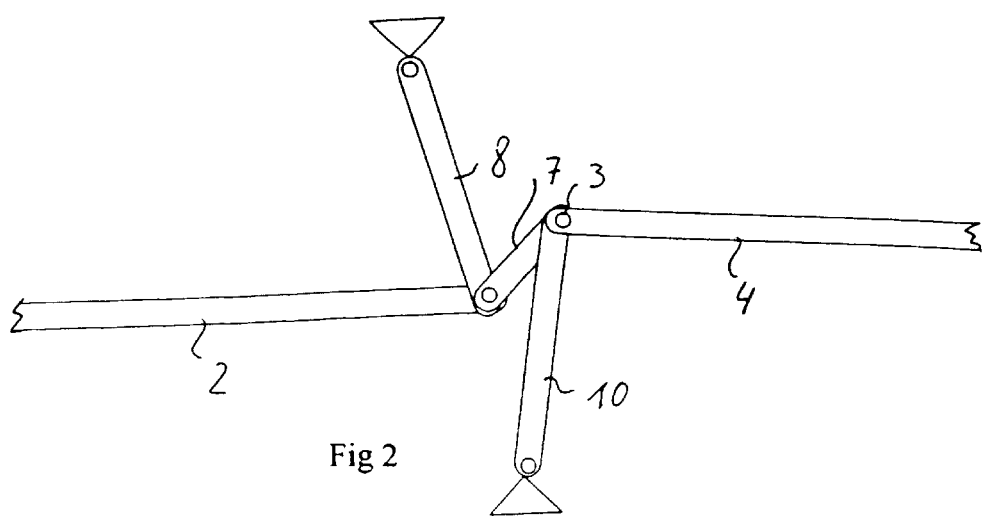
Figure 3:
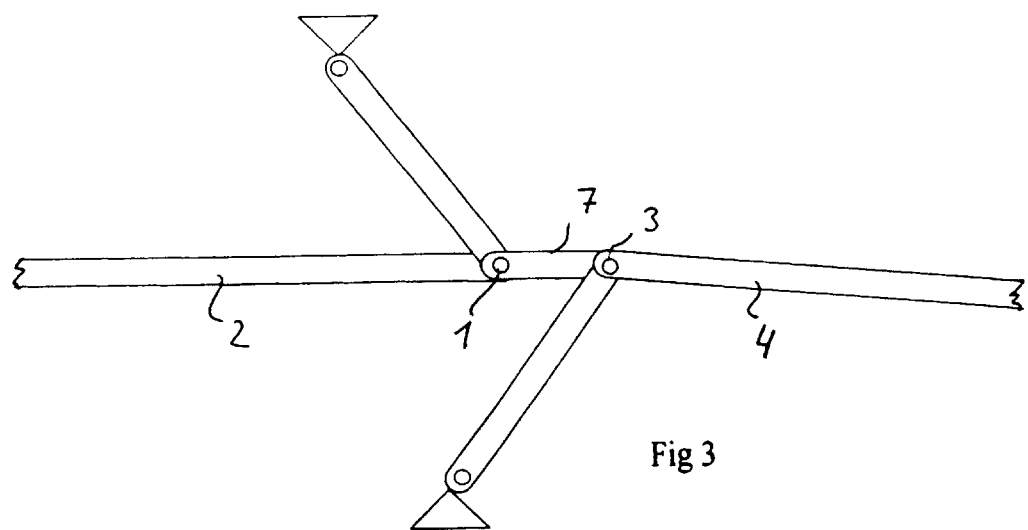
Figure 4:
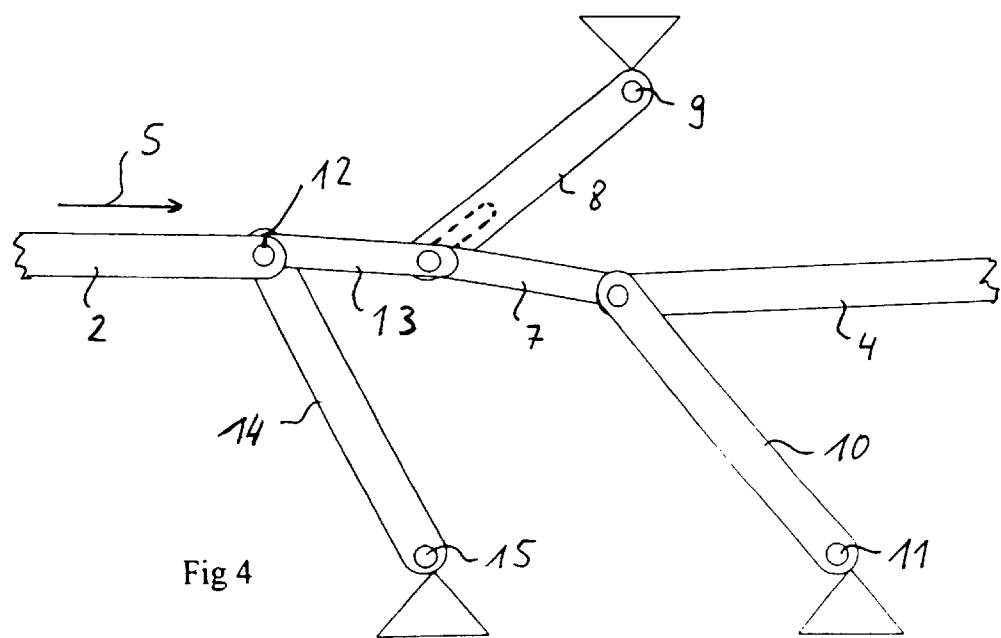
Figure 5:
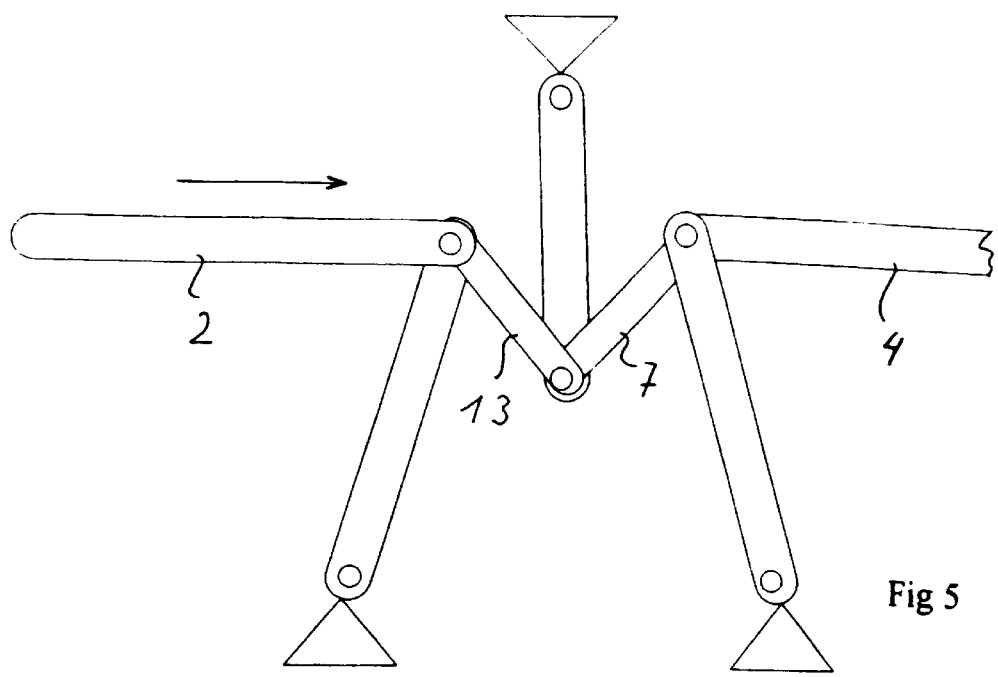
Figure 6:
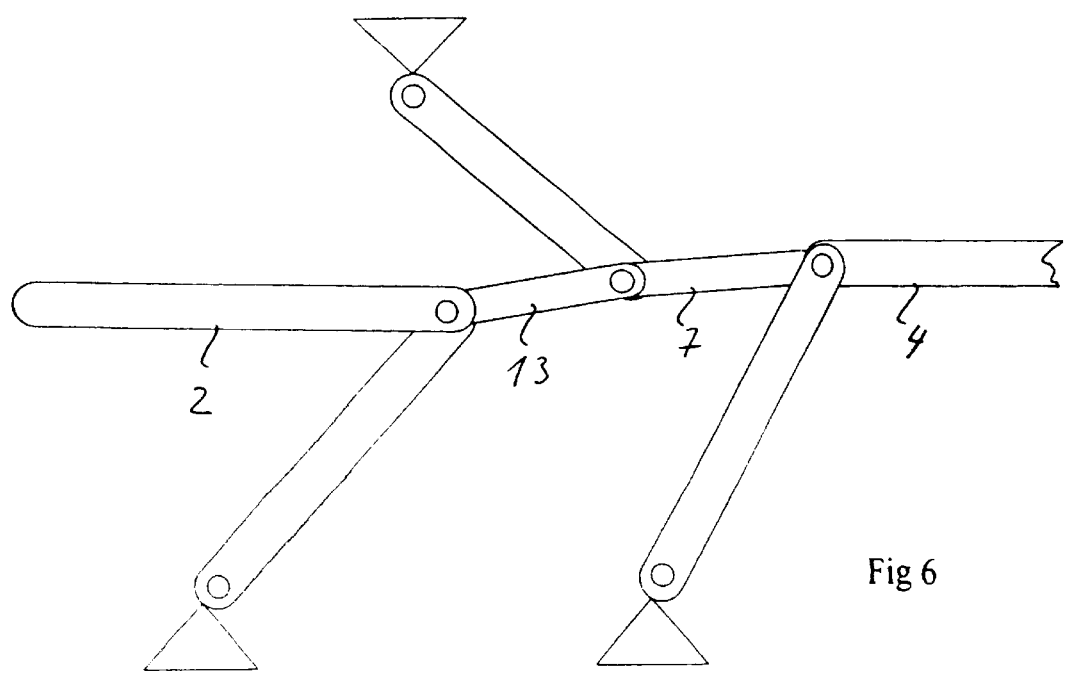
Figure 7:
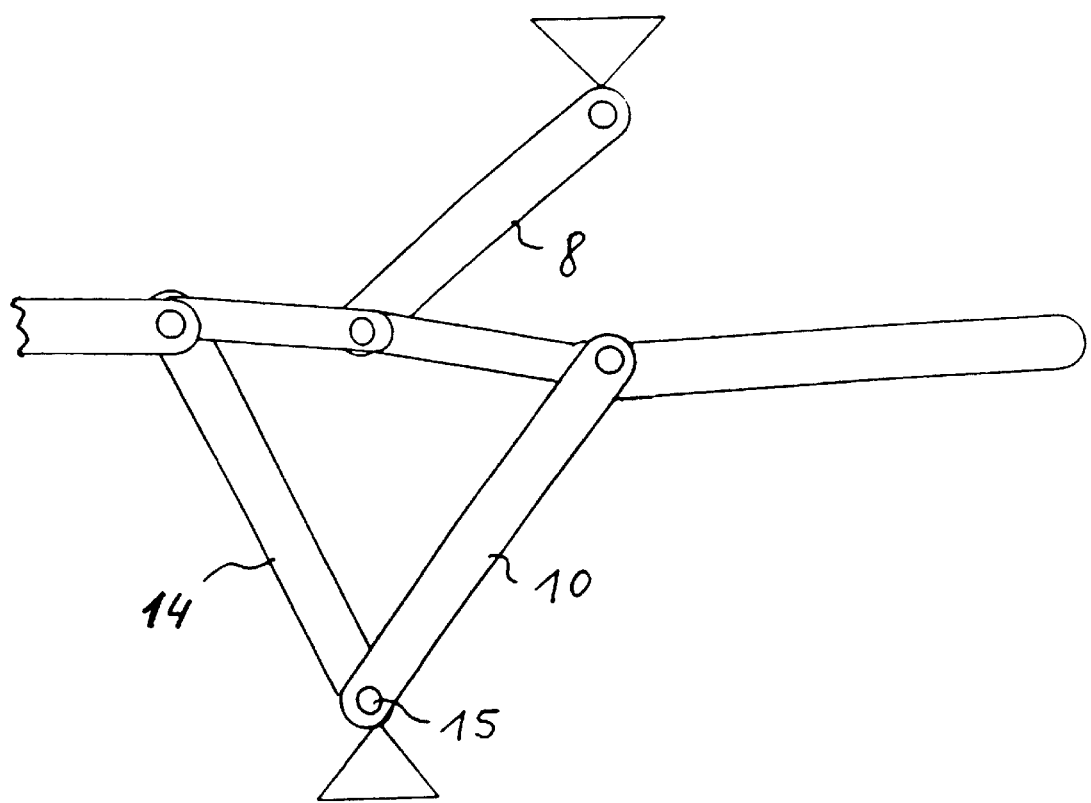
Figure 8:
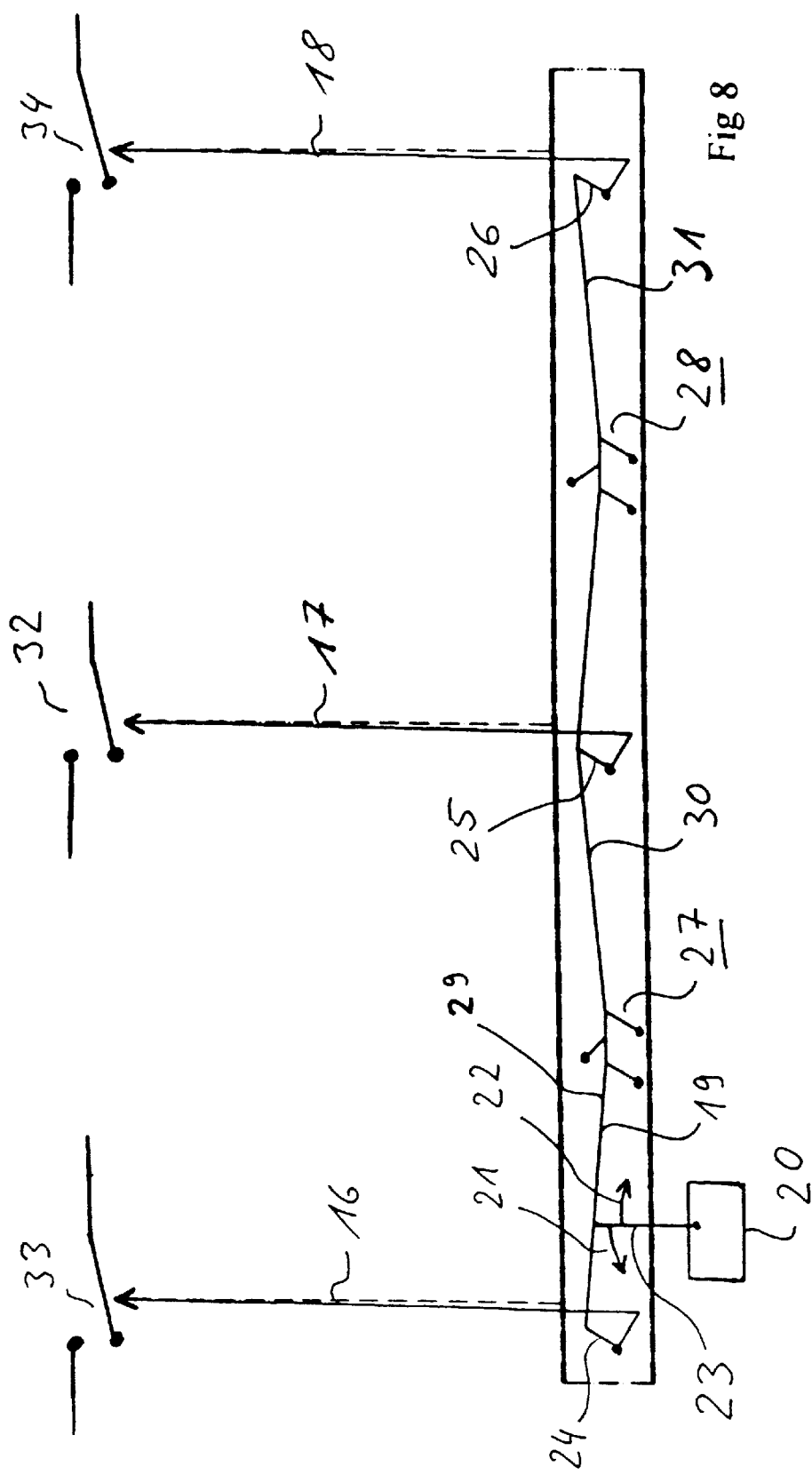
Figure 9:
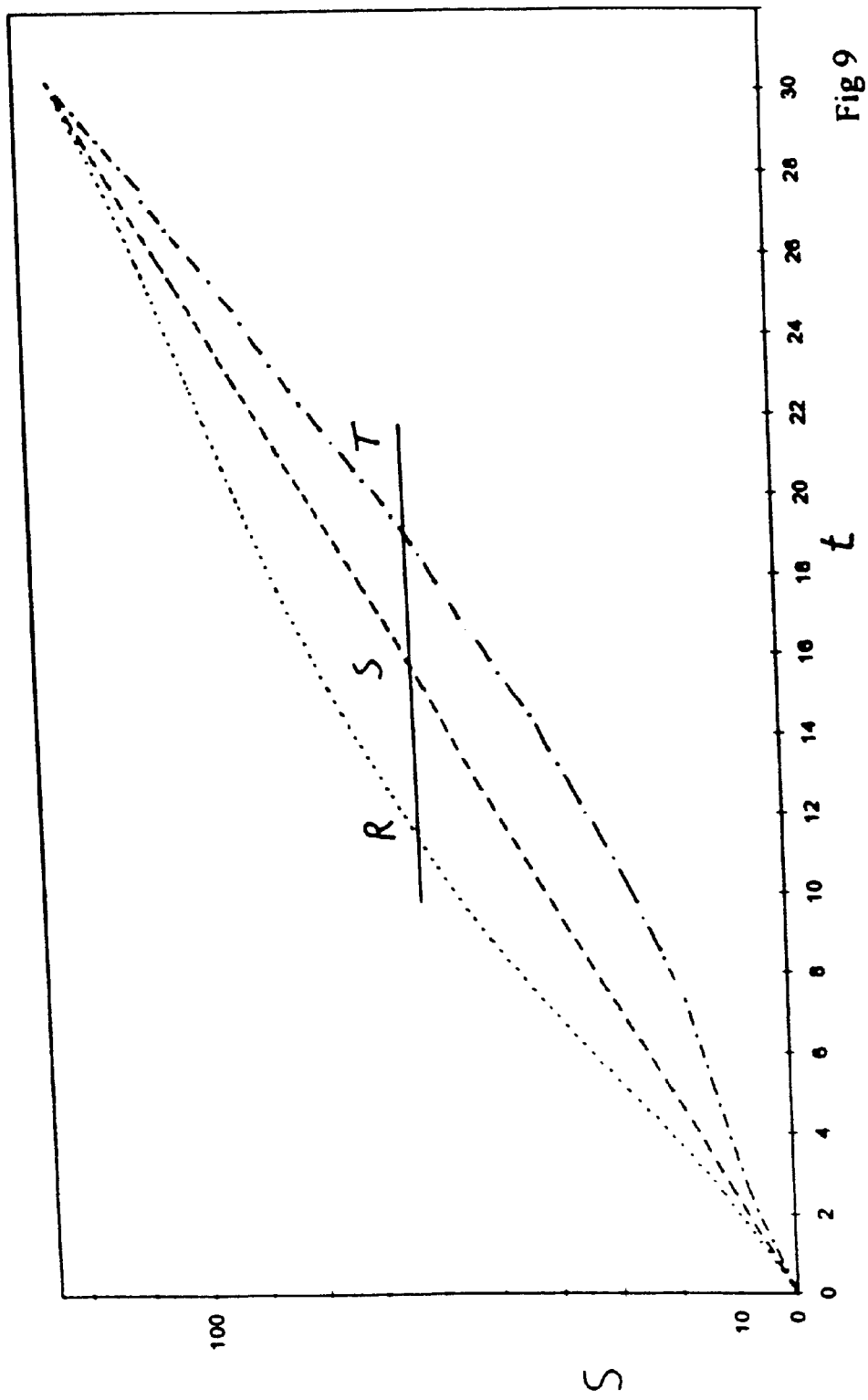
Figure 10:
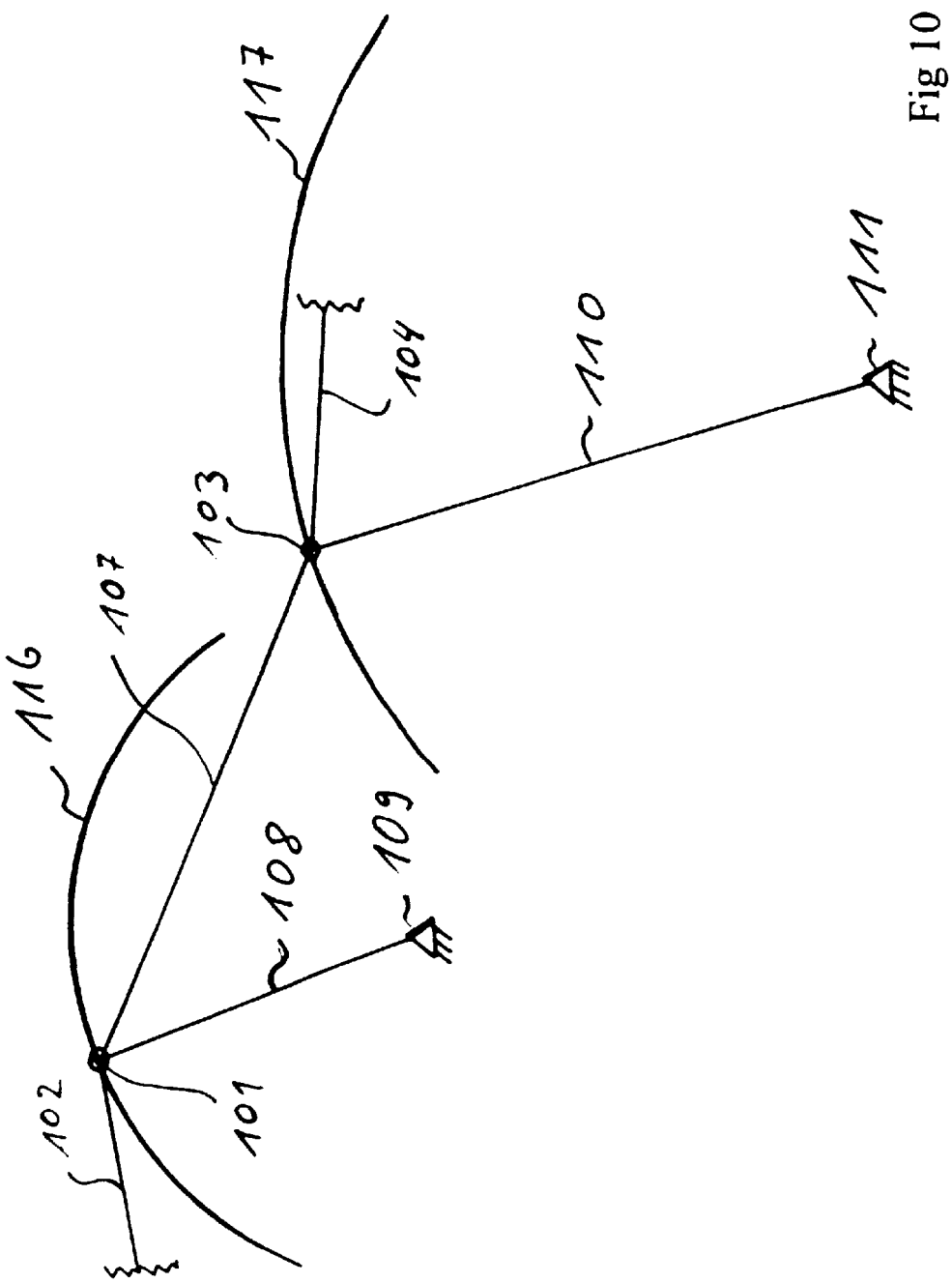
Figure 11:
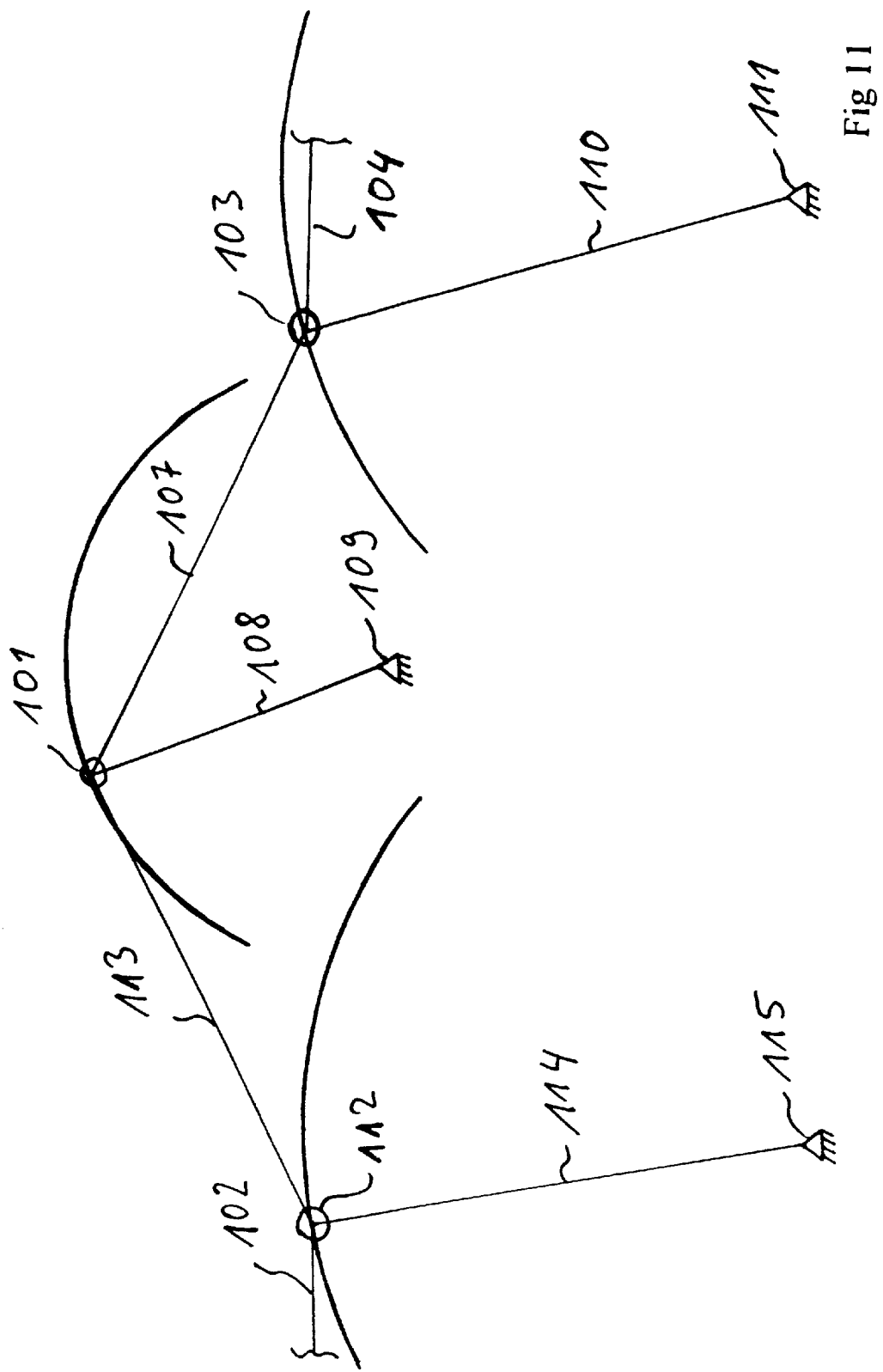

The invention will first of all be illustrated in a drawing, with reference to exemplary embodiments, and will then be described. In this case, in the figures:

FIGS. 1 to 3 show a schematic illustration of a first simple embodiment of the apparatus according to the invention, FIGS. 4 to 6 show the apparatus schematically, in a version duplicated in mirror-image form, FIG. 7 shows, schematically, an embodiment in which the first and third fixed-position bearing point coincide, and FIG. 8 shows a schematic illustration of a three-pole high-voltage switch having an apparatus according to the invention, FIG. 9 shows a movement/time diagram for three switch poles, and FIGS. 10 and 11 show, schematically, configurations with bearing points located on a single side of the movement path of the rigid element or elements.

FIG. 1 shows, schematically, an apparatus for transmitting a movement, having a first coupling element 1 to which a first component 2 in the form of a first drive rod part can be coupled, and having a second coupling element 3 which can be connected to a second component in the form of a second drive rod section 4.

The drive rod sections 2, 4 can be moved in the direction of the arrows 5, 6. The coupling elements 1, 3 are each formed by bolts, which pass through the two ends of a coupling rod 7 so that the coupling rod 7 forms a rigid element which connects the coupling elements 1, 3 to one another such that they can move. The first coupling element 1 is connected in a hinged manner to a first lever 8, which is mounted at a first fixed-position bearing point 9 such that it can pivot. This hinged connection can be designed such that the first coupling element 1 passes through a drilled hole in the first lever, although an elongated hole, which is indicated by a dashed line in FIG. 1, can also be provided in the first lever 8, instead of the drilled hole.

The second coupling element 3 is connected in a hinged manner to a second lever 10, which is mounted at a second fixed-position bearing point 11 such that it can pivot.

The bolts which form the first coupling element 1 and the second coupling element 3 each pass through the ends of the first lever 8, the coupling rod 7 and the first drive rod section, on the one hand, and the ends of the second lever 10, the coupling rod 7 and the second drive rod section 4, on the other hand.

The first drive rod section 2 is connected to a drive, which is not illustrated in any more detail but which drives the drive rod section 2 in the direction of the arrow 5.

The first lever 8 is in consequence pivoted counterclockwise about the fixed bearing point 9. This movement is transmitted by means of the coupling rod 7 to the end of the second lever 10, which is then pivoted clockwise.

FIG. 2 illustrates an intermediate situation during the described movement. Owing to the pivoting movement of the first lever 8 and of the second lever 10, the coupling rod 7 has been rotated, and the projection of the coupling rod 7 onto the horizontal connecting line between the first drive rod section 2 and the second drive rod section 4 has been shortened.

In this situation, the first drive rod section 2 has moved through a certain distance in the direction of the arrow 5, while the second drive rod section 4 has moved through a shorter distance in the same direction.

If the movement is continued further in the described sense, that is to say the first lever 8 is pivoted further counterclockwise and the second lever 10 is pivoted in a corresponding manner further clockwise, then this results in the situation illustrated in FIG. 3, in which the coupling rod 7, as illustrated in FIG. 1, forms an extension of the first and of the second drive rod sections 2, 4.

In order to reach this situation, the first drive rod section 2 has traveled through a certain distance from the start of the movement. Overall, the second drive rod section 4 has traveled through a distance of equal length. The projection of the coupling rod onto the horizontal connection between the first and the second drive rod section now once again corresponds to the length of the coupling rod 7, and the entire arrangement, comprising the drive rod sections 2, 4 and the coupling rod 7, is extended again.

The overall movement corresponds approximately to the longitudinal movement of an imaginary drive rod, which is formed by the drive rod sections 2, 4 and the coupling rod 7, in the direction of the arrow 5 shown in FIG. 1. During this movement, the positive guidance of the coupling rod 7 on the levers 8, 10 results in the imaginary drive rod being kinked inward, and thus in the drive rod sections 2, 4 approaching one another.

Towards the end of the movement, the arrangement comprising the drive rod sections 2, 4 and the coupling rod 7 is extended once again.

In summary, it can thus be stated that the translational movement of the first drive rod section is initially transmitted to the first coupling element 1, and that this translational movement is initially transmitted with a step-up ratio of 1:1 to the second coupling element 3 and to the second drive rod section 4.

In a central section of the movement, as is illustrated in FIG. 2, a translational movement of the first drive rod section 2 is transmitted with a lower step-up ratio to the second coupling element 3 and to the second drive rod section 4. The second drive rod section 4 thus moves more slowly than the first drive rod section 2.

If the movement is continued further, then the extension of the arrangement accelerates the second coupling element 3 and the second drive rod section 4, which now move faster than the first drive rod section 2 until a completely extended arrangement is reached.

Thus, from the start to the end of the movement, the first drive rod section 2 and the first coupling element 1, and the second drive rod section 4 and the second coupling element 3, cover the same distance overall. However, over part of the distance, the second coupling element 3 and the second drive rod section 4 lag behind the movement of the first drive rod section 2, in order for the retardation to be corrected once again by an acceleration of the movement.

FIG. 4 illustrates an apparatus which, for example, corresponds to a mirror-image duplicating apparatus from FIGS. 1 to 3. The apparatus shown in FIG. 4 can be formed from the apparatus shown in the previous figures by additional introduction of a third coupling element 12 in the form of a further bolt, a second rigid element 13 in the form of a second coupling rod, and a third lever 14, which is mounted in a fixed position at a bearing point 15 such that it can pivot.

FIG. 4 shows the overall arrangement comprising the first drive rod section 2, the first rigid element 7 in the form of a coupling rod, the second rigid element 13 in the form of a second coupling rod, and a second drive rod section 4, in extended form.

A thrust movement of the first drive rod section in the direction of the arrow 5 causes a pivoting movement of the first lever 8 counterclockwise, and a pivoting movement of the second lever 10 and of the third lever 14 clockwise.

The second drive rod section 4 is then likewise moved in the direction of the arrow 5.

At the same time, the positive guidance of the rigid elements 7, 13 by means of the levers 8, 10, 14 which are mounted in fixed positions results in the arrangement being kinked inward, as is illustrated in FIG. 5. The kinking inward of rigid elements 7, 13 results in the first drive rod section 2 and the second drive rod section 4 approaching one another, as a result of which, despite the second drive rod section 4 moving in the same sense, it travels a shorter distance than the first drive rod section 2. In the example illustrated in FIGS. 4 to 6, the retardation of the second drive rod section 4 in comparison to that of the first drive rod section 2 is further reinforced in comparison to the apparatus shown in FIGS. 1 to 3, since the kinking-in effect occurs approximately in a duplicated mirror-image form. Such an arrangement thus allows a greater deceleration of the movement to be transmitted to be achieved.

If the movement of the apparatus is continued in the indicated sense, then this leads to the constellation which is illustrated in FIG. 6, in which the rigid elements 7, 13 together with the first drive rod section 2 and the second drive rod section 4 once again form an extended arrangement, as at the start of the movement.

The second drive rod section 4 has thus once again recovered the retardation in the final part of the movement, owing to the additional acceleration.

In this variant, the first lever 8 may also have an elongated hole for guiding the first coupling element 1 (illustrated by a dashed line).

FIG. 7 illustrates a variant in which the fixed-position bearing points for the second lever 10 and for the third lever 14 coincide at one point. Thus, although the function is otherwise approximately the same, one bearing point is saved, and the design is simplified and made more cost-effective.

FIG. 8 illustrates a three-pole high-voltage power breaker having a first switch pole 16, a second switch pole 17 and a third switch pole 18, which can be driven by means of a common drive rod 19 by a switched drive 20. The drive 20 produces a pivoting movement of the drive crank 23 in the direction of the arrows 21 and 22.

In the illustrated form, the three switch poles are in the disconnected position.

Pivoting the drive crank 23 in the direction of the arrow 21, that is to say counterclockwise, results in the drive movement being converted by means of the respective direction-changing cranks 24, 25, 26, which are each mounted in fixed positions, into a vertical, upward-directed movement of the switching rods of the switch poles 16, 17, 18. The respective direction-changing cranks 24, 25, 26 are mounted in a fixed position, such that they can pivot, in the respective bearing point, which is represented by thickened lines.

Two apparatuses 27, 28 according to the invention are provided in the course of the drive rod 19 and initially result in retarded transmission of the drive movement for the second drive rod section 30 in comparison to that of a first drive rod section 29 arranged in the region of the drive 20 and, to an even greater extent, for the third drive rod section 31 during a switching-on movement, in order to cancel out the retardation toward the end of the drive movement.

The individual apparatuses 27, 28 are illustrated only schematically in FIG. 8 but, in principle, correspond to the apparatus illustrated in FIG. 4. The fixed-position bearing points are indicated only by thickened dots in FIG. 8.

In order to describe the actual switching movement, it should be noted that the movement of the individual switch poles 16, 17, 18 in each case starts at the same point in time, and all the switch poles also reach the end of their movement at the same point in time.

However, the retardation of the second switch pole 17 and of the third switch pole 18 in a central region of the movement results in the contact making process, that is to say the making of the first conductive contact between the two switching contacts of the interrupter unit 32 of the second switch pole 17 and of the interrupter unit 34 of the third switch pole 18, taking place later than in the case of the interrupter unit 33 of the first switch pole 16.

However, once this contact has been made, the interrupter unit 32 of the second switch pole 17 recovers once again as a result of subsequent acceleration to match the movement state of the interrupter unit 33 of the first switch pole 16.

The interrupter unit 34 of the third switch pole 18 makes its contact only after contact has been made by the interrupter unit 32 of the second switch pole 17, but is then accelerated to a major extent after this in the extension phase of the apparatus shown in FIG. 4 and, in consequence, recovers in the remaining movement phase, in which all the switching contacts are pushed together once again, in order to achieve a good current carrying capacity, to such an extent that all three switch poles reach the same final position at the same point in time.

The invention thus results in all the switch poles each starting and ending their movement at the same point in time and, as is respectively desired, the capability to retard one or two switch poles prior to contact making in the course of the movement although, once contact has been made, this is recovered in the further course of the switching movement.

The movement-time diagram of the three switch poles 16, 17, 18 for the three phases R, S, T is illustrated schematically, by way of example, in FIG. 9.

FIG. 10 shows, schematically, an apparatus according to the invention to one side of which a first component in the form of a first drive rod section 102 can be coupled, and to the other side of which a second component in the form of a second drive rod section 104 can be coupled. The two drive rod sections 102, 104 are each illustrated only partially.

The coupling elements 101, 103 are formed by bolts, which respectively connect a rigid element 107 in the form of a rod firstly to a first lever 108 and secondly to a second lever 101, in a hinged manner. The first lever 108 is mounted at a first fixed-position bearing point 109 such that it can pivot, while the second lever 110 is mounted at a second fixed-position bearing point 111 such that it can pivot.

The movement paths of the first and of the second coupling element 101, 104 which are made possible by a pivoting movement of the first and of the second lever 108, 110 are represented by circular path sections 116, 117.

The bearing points 109, 111 are located alongside one another on the same side of the movement path of the rigid element 107. The first lever 108 and the second lever 110 move in the same rotation sense during the process of any movement which is to be transmitted.

When a thrusting movement onto the first coupling element 101 takes place through the drive rod section 102, then the first and the second lever 108, 110 are pivoted clockwise, with the rigid element 107 transmitting the movement to the second drive rod section 104.

At the start of the movement, the first drive rod section 102 and the second drive rod section 104 are moving at approximately the same speed. In a second phase shortly after the start of the movement, the kinking inward of the rigid element 107 between the drive rod sections 102, 104 results in the second drive rod section 104 being retarded. In a third section of the movement, the second drive rod section 104 is accelerated once again by extension of the arrangement comprising the drive rod sections 102, 104 and the rigid element 107, so that, toward the end of the movement, the distance traveled by the second drive rod. section 104 corresponds approximately to the distance traveled by the first drive rod section 102.

Depending on whether the drive is coupled to the first component or the output drive is coupled to the second component, as illustrated here, or whether the drive is coupled to the second component and the output drive is coupled to the first component, the apparatus according to the invention also allows the component on the output side to be accelerated at the start of the movement, and subsequently to be retarded.

FIG. 11 shows an arrangement which is duplicated in mirror-image form in comparison to that in FIG. 10, with the first rigid element 107 being coupled by means of the first coupling element 101 to a second rigid element 113 which, for its part, is connected to the first drive rod section 102 by means of the third coupling element 112.

The third lever 114 is likewise connected in a hinged manner to the coupling element 112 in the form of a connecting bolt, and, for its part, is mounted in a fixed position in the bearing point 115 such that it can pivot.

This arrangement results in a movement profile which is similar to that of the arrangement shown in FIG. 10, but with greater retardation, and subsequently greater acceleration, of the second component being achieved by the duplication of the arrangement. In comparison to the arrangement illustrated in FIGS. 4 to 7, in which the fixed-position bearing points are located on opposite sides of the movement paths of the rigid elements, the arrangement shown in FIG. 11 has the advantage that the retardation of the second component in the second, central phase of the movement, together with the subsequent acceleration, are somewhat less pronounced than in the case of the exemplary embodiment in FIGS. 4 to 7, so that, according to FIG. 11, there is less difference between the speeds of the first drive rod section 102 and of the second drive rod section 104 in the central part of the movement. This is important, bearing in mind the fact that, when the apparatus is used in a high-voltage power breaker, the speeds of the switching contacts to be moved in a polyphase high-voltage power breaker must not differ excessively from one another. Thus, in the last-mentioned embodiment, the difference between the contact speeds of the individual poles of the high-voltage power breaker is restricted.

What is claimed is:

1. An apparatus for transmitting a movement between two components, which, as a function of a first, translational movement of a first coupling element (1, 101) to which a first component (2, 102) is coupled, produces a translational movement of a second coupling element (3, 103) to which a second component (4, 104) is coupled, characterized in that the first and the second coupling element (1, 3, 101, 103) are connected to one another, such that they can move, by means of a first rigid element (7, 107), and in that the first coupling element (1, 101) is connected in a hinged manner to a first lever (8, 108) which is mounted at a first, fixed-position bearing point (9, 109) such that it can pivot, and in that the second coupling element (3, 103) is connected in a hinged manner to a second lever (10, 110) which is mounted at a second fixed-position bearing point (11, 111) such that it can pivot, and in that the first and the second bearing point (9, 11, 109, 111) are spaced apart from one another, and are located on opposite sides of the movement path of the first rigid element (7, 107).

2. The apparatus as claimed in claim 1, characterized in that the first coupling element (101) is connected to a third coupling element (112) by means of a second rigid element (113) such that they can move, which third coupling element (112) is also connected in a hinged manner to a third lever (114) which is mounted at a third fixed-position bearing point (115) such that it can pivot, and in that the first, the second and the third bearing point (108, 115) are located alongside one another on the same side as the movement path of the first and of the second rigid element (107, 113), and in that the second component (104) can be coupled to the third coupling element (112).

3. The apparatus as claimed in claim 1, characterized in that the first and the second bearing point (9, 11) are located opposite one another on different sides of the movement paths of the first and of the second coupling element (1, 3).

4. The apparatus as claimed in claim 3, characterized in that the first coupling element (1) is connected to a third coupling element (12) by means of a second rigid element (13) such that they can move, which third coupling element (12) is also connected in a hinged manner to a third lever (14) which is mounted at a third fixed-position bearing point (15) such that they can pivot, in that the first and the third bearing point (8, 15) are located opposite one another on different sides of the movement paths of the first and of the third coupling element (1, 12), and in that the second component (4) can be coupled to the third coupling element (1, 12).

5. The apparatus as claimed in claim 2 or 4, characterized in that the distance between the first fixed-position bearing point (9) and the second fixed-position bearing point (11) is equal to the distance between the first bearing point (9) and the third bearing point (15).

6. The apparatus as claimed in claim 2, 4 or 5, characterized in that the lengths of the first and of the second rigid element (7, 13) are equal.

7. The apparatus as claimed in claim 4, characterized in that the second and third bearing point (11, 15) are identical.

8. The apparatus as claimed in claim 4, wherein a distance between the first fixed-position bearing point and the second fixed-position bearing point is equal to a distance between the first bearing point and the third bearing point.

9. The apparatus of claim 1, wherein a first translational movement of the first coupling element, to which the first component is coupled, produces a translational movement of the second coupling element, to which the second component, is coupled.

* * * * *